April 7, 1925.
H. E. BROWNE ET AL
1,532,876
SIGNAL FOR AN AUTOMOBILE OR OTHER VEHICLE AND STREET AND ROAD PURPOSES
Filed July 23, 1923     2 Sheets-Sheet 1
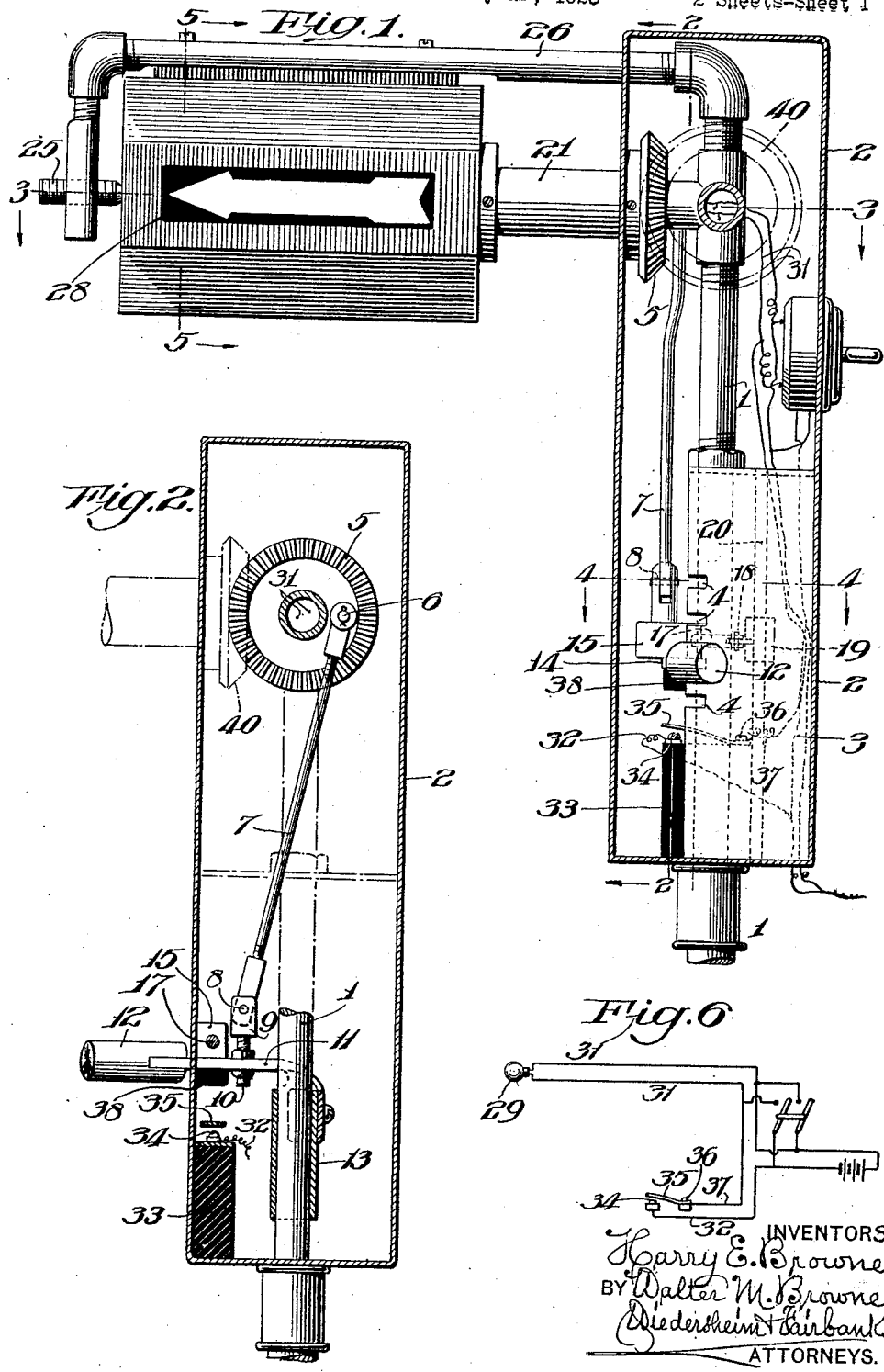
INVENTORS:
Harry E. Browne.
BY Walter M. Browne.
Diederheim + Fairbanks
ATTORNEYS.

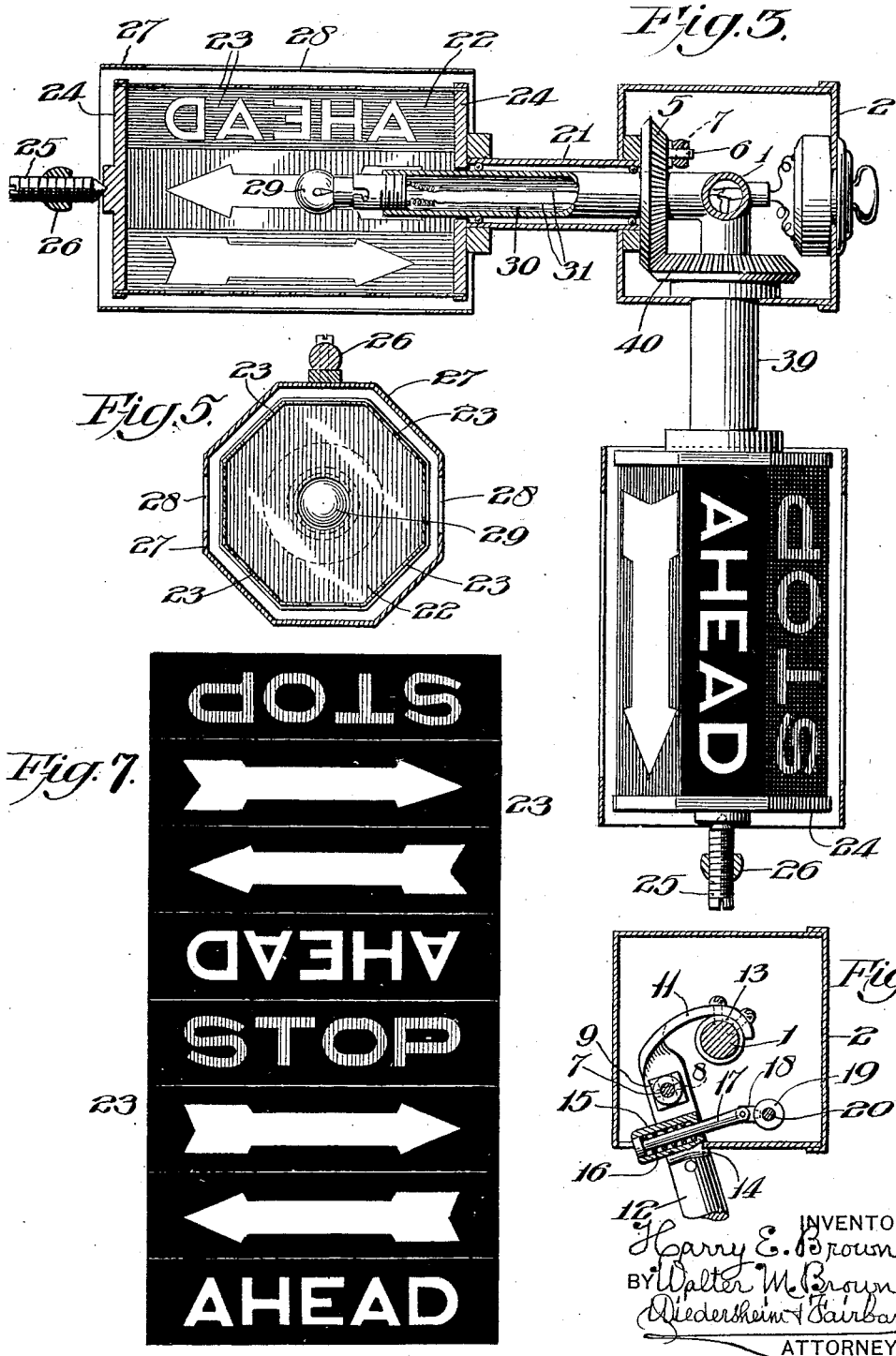

Patented Apr. 7, 1925.

1,532,876

UNITED STATES PATENT OFFICE.

HARRY E. BROWNE AND WALTER M. BROWNE, OF PLAINFIELD, NEW JERSEY.

SIGNAL FOR AN AUTOMOBILE OR OTHER VEHICLE AND STREET AND ROAD PURPOSES.

Application filed July 23, 1923. Serial No. 653,086.

*To all whom it may concern:*

Be it known that we, HARRY E. BROWNE and WALTER M. BROWNE, of Plainfield, in the county of Union, State of New Jersey, have invented a new and useful Signal for an Automobile or Other Vehicle and Street and Road Purposes, of which the following is a specification.

Our invention consists of a signal for an automobile or other vehicle and for street purposes adapted to indicate and announce in the vehicle stoppage, starting ahead, or go, and direction of running of the vehicle, and for controlling travel in streets or roads and crossings and intersections of the latter by an officer assigned therefor, the construction and operation of the same being hereinafter set forth, and the novel features thereof pointed out in the claims.

The invention is satisfactorily illustrated in the accompanying drawing, but the important instrumentalities thereof may be varied, and so it is to be understood that the invention is not limited to the specific details shown and described, as long as they are within the scope of the claims.

Figure 1 represents a side elevation partly in vertical section of a signal embodying our invention.

Figure 2 represents a vertical section thereof on line 2—2 Figure 1.

Figure 3 represents a horizontal section on the line 3—3 Figure 1.

Figure 4 represents a horizontal section of a portion on line 4—4 Figure 1.

Figure 5 represents a vertical section of a portion thereof on line 5—5 Figure 1.

Figure 6 represents a diagrammatic view of the electric wire employed.

Figure 7 represents a face view of the signal plates employed.

Similar numerals of reference indicate corresponding parts in the figures.

Referring to the drawings.

1 designates a standard which may be connected with a suitable portion of an automobile or other vehicle for use of the signalling device on the latter or anchored in the ground for use of said device for street or road purposes.

Connected with said standard is the casing 2, and the vertically extending plate 3, the latter being within the casing and having in one side thereof the series of horizontally extending recesses 4.

In the upper portion of the casing is the rotatable wheel 5 whose bearings are on the adjacent portion of the column 1, said wheel having on its side the wrist pin 6 on which is fitted the upper end of the rod 7 whose lower end is connected by the pivot 8 to the block 9, the latter being secured by a suitable bolt and nuts 10 on the shank 11 of the handle 12, the inner end of said shank being connected with the sleeve 13 which is vertically slidable on the standard 1.

A portion 14 of said shank at the inner end of the handle proper is adapted to act as a tooth to enter either of the recesses 4 in the plate 3 and so interlock said shank with said plate and consequently the rod 7 where the wheel 5 is held in the position to which it may be rotated.

Connected with the shank 11 of the handle, see Figure 4 is the box 15 in which is contained the spring 16 which is adapted to press against the head of a bolt 17 which passes through the end of said box and is connected by a joint or knuckle member 18 which is attached to the collar 19, the latter being slidably supported on the vertical rod 20 in the casing 2.

The spring 16 and head of the bolt 17 limits the motion of the handle 12 in the present case to the left and prevents disconnection of the handle from the spring box 15, it being seen that when the handle is thus moved, the tooth portion 14 of the shank 11 is withdrawn from the recess 4 that it occupied, said handle is unlocked from the plate 3, the spring 16 then being compressed. Then the handle may be moved up or down in the space at the left of the plate 3 and the casing 2 carrying with it the rod 7 whereby the wheel 5 is rotated to a certain extent, and when the tooth portion 14 of the shank reaches another recess 4 as selected it is directed into the latter when the spring 16 is permitted to expand and so retains said tooth portion of the shank in the recess and interlocks the handle 12 with the plate 3, and preventing motion of the rod 7 and consequently of the wheel 5.

Connected with the side of said wheel 5 opposite to the wrist pin 6 is the rotatable sleeve 22 one end of which has its bearing on the adjacent portion of the casing 2, the other end of said sleeve being attached to the signal body 22 which in the present case is octagonal in form composed of transparent plates 23 which comprise the periphery of said body and heads 24 with which the ends of said plates are secured. One of said heads has the sleeve 21 secured to it while the other head receives the end of the threaded pivot pin 25 which is supported on a limb of the arm 26 which extends from the upper end of the standard 1 and is coupled therewith, it being seen that by these means the signal body 22 is rotatably supported.

Stationarily surrounding said body is the sheath 27 which depends from and is firmly secured to the arm 26, it being preferably of octagonal form and having in two opposite sides the openings 28 through which the plates 23 are visible, it being noticed that said plates have thereon the names of signals such as "stop" and "ahead," and the representations of right and left hand pointed direction arrows, said names and representation being in duplicate, the plates being so disposed that when a name or representation appears at one of the openings 28 its counterpart will appear at the other opening 28, and the chauffeur or driver of the vehicle can see that the rightful signal is displayed. This display is caused by manipulating the handle to release it and then raising or lowering it, when as the rod 7 follows its motion the wheel 5 is thus rotated to a partial extent when as is evident the signal body 22 is rotated to a partial extent in either direction to bring the desired signal names or representations of the respective plates to the openings 28 of the sheath where they are visible to the public and the chauffeur or driver.

The plates 23 are transparent and so the names and representations painted or otherwise formed thereon with suitable backgrounds are readily visible in day time, but for night purposes an illumination is provided therefor by the electric lamp 29 in the body 22, the socket thereof being connected with the tube 30 which is inclosed in the sleeve 21 and supported on one of the heads 24 of said body and the upper end of the standard 1.

In said tube are passed the wire conductors 31 which lead to the switch 32 and from thence to a battery or other suitable source of electrical energy.

As the signal "stop" is most important, it is generally red in color, and so should be illuminated in the day time as well as at night, there is provided on the lower part of the casing 2, the additional conductor 32 which is connected with the insulating piece 33 in said casing by the binding screw or post 34 and the contact piece 35 whose free end overhangs said screw, and its other end is connected with said piece 33 by the binding screw or post 36 which also secures an additional conductor 37 to said contact piece. The conductors 32 and 37 are connected with the conductors and so complete an electric circuit for said conductors 32 and 37. Now the plates having thereon the word "Stop" are so arranged in the body 22 and the wheel 5 and rod 7 are so timed in relation to said plates that the latter are presented to the openings 28 in the sheath to be visible therethrough when said rod is at its lowest point, in which case the tooth portion of the shank of the handle 12 will enter the lowest recess 4 in the plate 3. Then said shank has secured thereto and depending therefrom the insulating block 38 which is adapted to reach the contact piece 35 and lower the same against the binding screw or post 33, thus closing the circuit and so the electric lamp is energized whereby the plates with "Stop" thereon are illuminated from within the body, 22.

At all times, however, the several plates may be illuminated by properly operating the switch 32 especially for purposes at night or dark days. For signalling at crossing or intersecting streets the signal body plates therein, the electric lamp, the inclosing sheath and connections are duplicated and placed at an angle to those hereinbefore first named, and supported on the casing 2 by the sleeve 39 which is also adapted to be rotated to operate the body 22 to bring the plates thereon successively in position back of the openings 28 in the sheath. In this case, said sleeve 39 has connected with it in the casing 2, the toothed bevel wheel 40 which is adapted to mesh with the wheel 5 which is also formed as a tooth bevel wheel 5 so that the latter operated by the rod 7 the handle 5 and appurtenances thereof will impart rotation to said wheel 40 and consequently to the additional signal body.

The wiring for the lamp in the latter is connected with the conductors 31 and so the lamps of the two bodies will be energized.

Having thus described our invention what we claim as new and desire to secure by Letters Patent, is:—

1. In a signal of the character stated, a horizontally mounted rotatable body, a series of signals on the periphery of said body, an inclosure for said body, stationarily supported thereover, said body having in its side an opening in register with either of said signals and through which a desired signal is displayed, a horizontal rotatable shaft carrying said body, a bevel gear wheel on said shaft, a second bevelled gear meshing with the first mentioned bevelled gear, a handle, and a connecting rod for said handle and last mentioned wheel whereby the body may receive rotary motion to an extent relatively to the signal that is to be displayed through said opening in said inclosure.

2. In a device of the character stated a vertical standard, means extended from said standard for supporting a signal display, a signal display horizontally supported by said means, a casing surrounding said vertical standard, a bevel gear wheel supported by said standard, a second bevel gear wheel operative to impart rotary movement to said signal display each of said bevel gears being mounted within said casing, an operating handle pivotally supported with respect to said casing, and a connecting rod within said casing connecting said first mentioned bevel gear wheel with said operating gear.

HARRY E. BROWNE.
WALTER M. BROWNE.

Witnesses:
JOSEPH T. VAIL,
ROBERT W. BURKS.